US012661841B2

(12) United States Patent (10) Patent No.: US 12,661,841 B2
Khan et al. (45) Date of Patent: Jun. 23, 2026

(54) PULP BOTTLE WITH MOLDED INTERIOR LINING AND METHODS OF MAKING SAME

(71) Applicant: LGAB LLC, Boca Raton, FL (US)

(72) Inventors: Fuad Khan, Cardiff CF (GB); Adam Berk, Boca Raton, FL (US); Lee Green, Boca Raton, FL (US)

(73) Assignee: LGAB LLC, Boca Raton, FL (US)

( * ) Notice: Subject to any disclaimer, the term of this patent is extended or adjusted under 35 U.S.C. 154(b) by 0 days.

(21) Appl. No.: 17/909,859

(22) PCT Filed: Mar. 12, 2021

(86) PCT No.: PCT/US2021/022094
§ 371 (c)(1),
(2) Date: Sep. 7, 2022

(87) PCT Pub. No.: WO2021/183877
PCT Pub. Date: Sep. 16, 2021

(65) Prior Publication Data
US 2023/0226741 A1 Jul. 20, 2023

Related U.S. Application Data

(60) Provisional application No. 62/989,116, filed on Mar. 13, 2020.

(51) Int. Cl.
*B29C 49/24* (2006.01)
*B29C 49/12* (2006.01)
(Continued)

(52) U.S. Cl.
CPC .............. *B29C 49/24* (2013.01); *B29C 49/12* (2013.01); *B65D 1/0215* (2013.01); *B65D 23/02* (2013.01);
(Continued)

(58) Field of Classification Search
CPC ............ B29C 49/24; B29C 2049/2404; B65D 1/0215; B65D 23/02; B65D 23/102;
(Continued)

(56) References Cited

U.S. PATENT DOCUMENTS

| 8,991,635 B2 | 3/2015 | Myerscough |
| 9,126,717 B2 | 9/2015 | Myerscough |
| (Continued) | | |

FOREIGN PATENT DOCUMENTS

| AU | 2012211504 | 8/2012 |
| CA | 1094963 | 2/1981 |
| (Continued) | | |

OTHER PUBLICATIONS

International Search Report mailed Jun. 1, 2021 for International PCT Application No. PCT/US2021/022094, 3 pages.
(Continued)

*Primary Examiner* — JaMel M Nelson
*Assistant Examiner* — Erica Hartsell Funk
(74) *Attorney, Agent, or Firm* — Zaher Li PLLC; Shawn S. Li

(57) ABSTRACT

A container with a shell and lining within its interior is provided. The shell and/or lining can be fabricated from a biodegradable, recyclable, and/or compostable material. The lining can be configured as a parison, a preform, and/or other mass that is capable of being expanded. The lining can be inserted within a cavity of the shell and caused to expand to form an expanded state. The lining, in the expanded state, may be used as a barrier, preventing beverage that is inserted into the container from making contact with the shell. The lining, in the expanded state, may be configured to maintain contact with an inner surface of the shell so as to provide adequate shock absorption. The lining can be a thin film, (Continued)

providing an overall thinner construction and/or an overall lighter construction can be used to fabricate the container.

12 Claims, 10 Drawing Sheets

(51) Int. Cl.

| | |
|---|---|
| *B65D 1/02* | (2006.01) |
| *B65D 23/02* | (2006.01) |
| *D21J 3/04* | (2006.01) |
| *B29K 1/00* | (2006.01) |
| *B29L 31/00* | (2006.01) |

(52) U.S. Cl.
CPC ......... *D21J 3/04* (2013.01); *B29C 2049/2404* (2013.01); *B29K 2001/00* (2013.01); *B29L 2031/7158* (2013.01)

(58) Field of Classification Search
CPC .......... D21J 3/04; D21J 3/07; B29K 2001/00; B29L 2031/7158
See application file for complete search history.

(56) References Cited

U.S. PATENT DOCUMENTS

| | | | |
|---|---|---|---|
| 2013/0140325 | A1 | 6/2013 | Myerscough |
| 2013/0140326 | A1 | 6/2013 | Myerscough |
| 2013/0145730 | A1 | 6/2013 | Myerscough |
| 2013/0146616 | A1 | 6/2013 | Myerscough |
| 2013/0146617 | A1 | 6/2013 | Myerscough |
| 2013/0206755 | A1 | 8/2013 | Myerscough |

FOREIGN PATENT DOCUMENTS

| | | | | |
|---|---|---|---|---|
| EP | 2338807 A1 * | 6/2011 | ............... | B31B 7/00 |
| EP | 2803467 | 11/2014 | | |
| EP | 3375592 | 9/2018 | | |
| EP | 3375593 | 9/2018 | | |
| WO | 2007066090 | 6/2007 | | |
| WO | 2009133355 | 11/2009 | | |
| WO | 2009133359 | 11/2009 | | |
| WO | 2013192260 | 12/2013 | | |

OTHER PUBLICATIONS

Written Opinion mailed Jun. 1, 2021 for International PCT Application No. PCT/US2021/022094, 5 pages.

* cited by examiner

FIG. 2A                  FIG. 2B

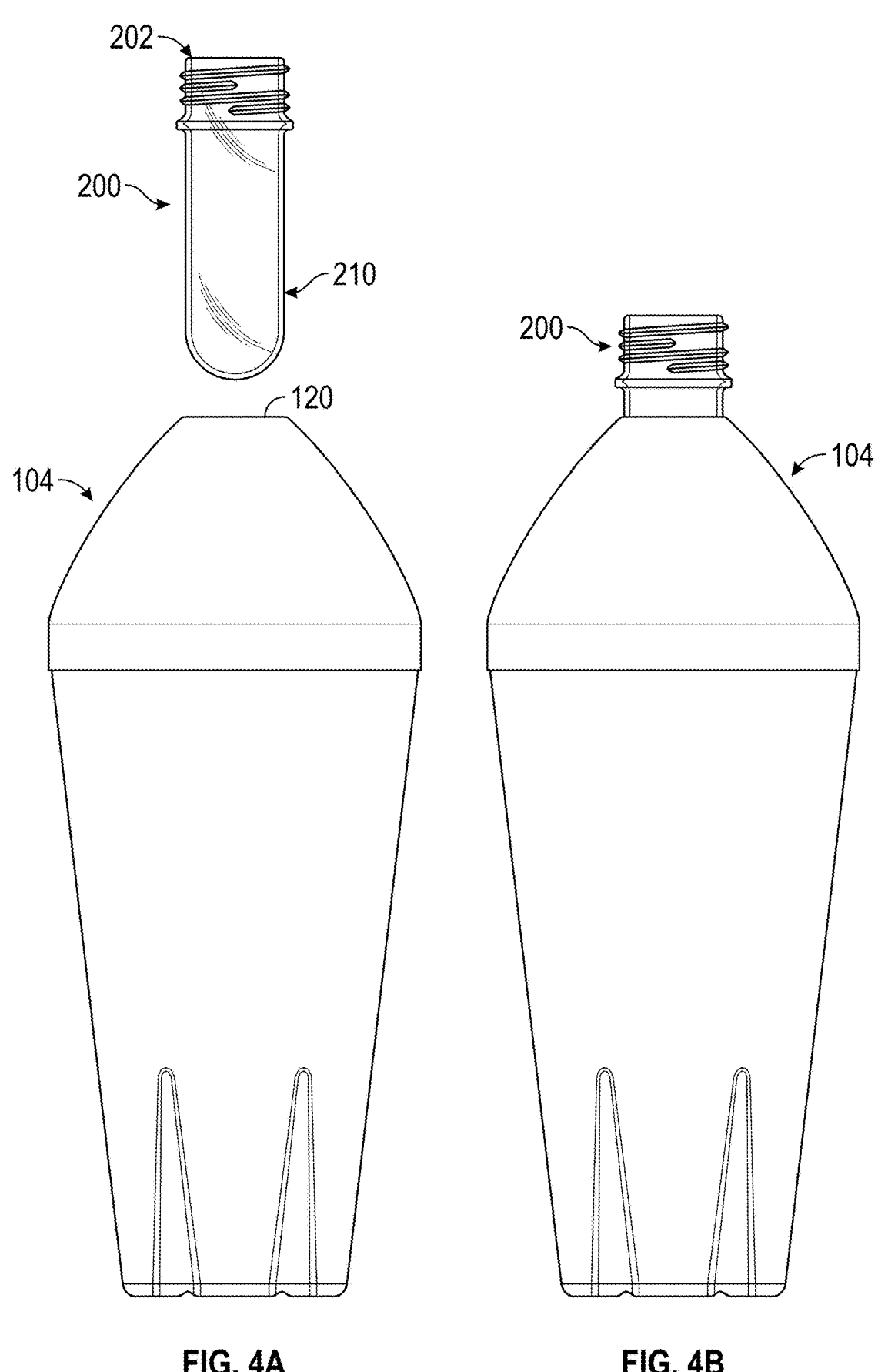
FIG. 4A                    FIG. 4B

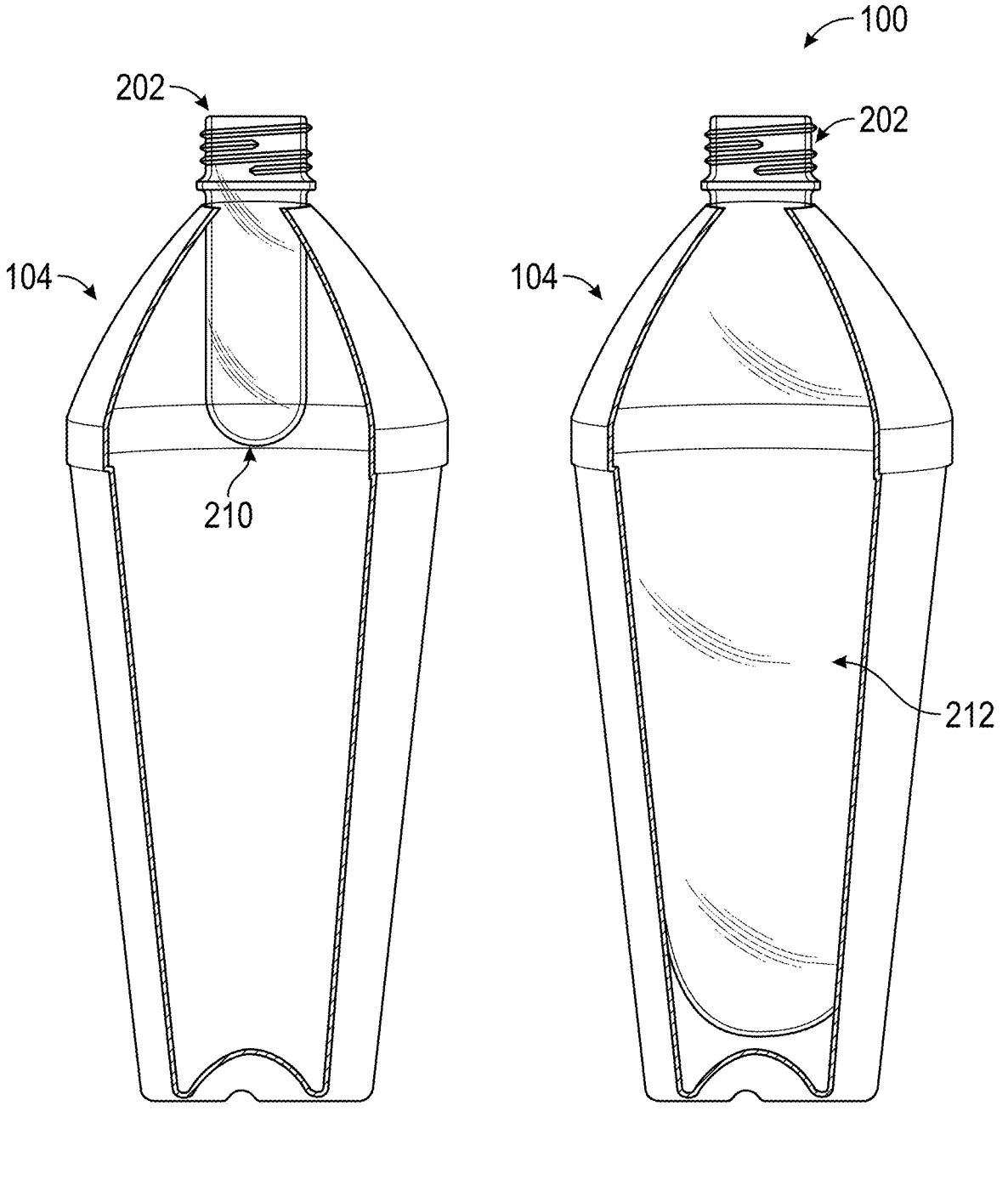
FIG. 4C                    FIG. 4D

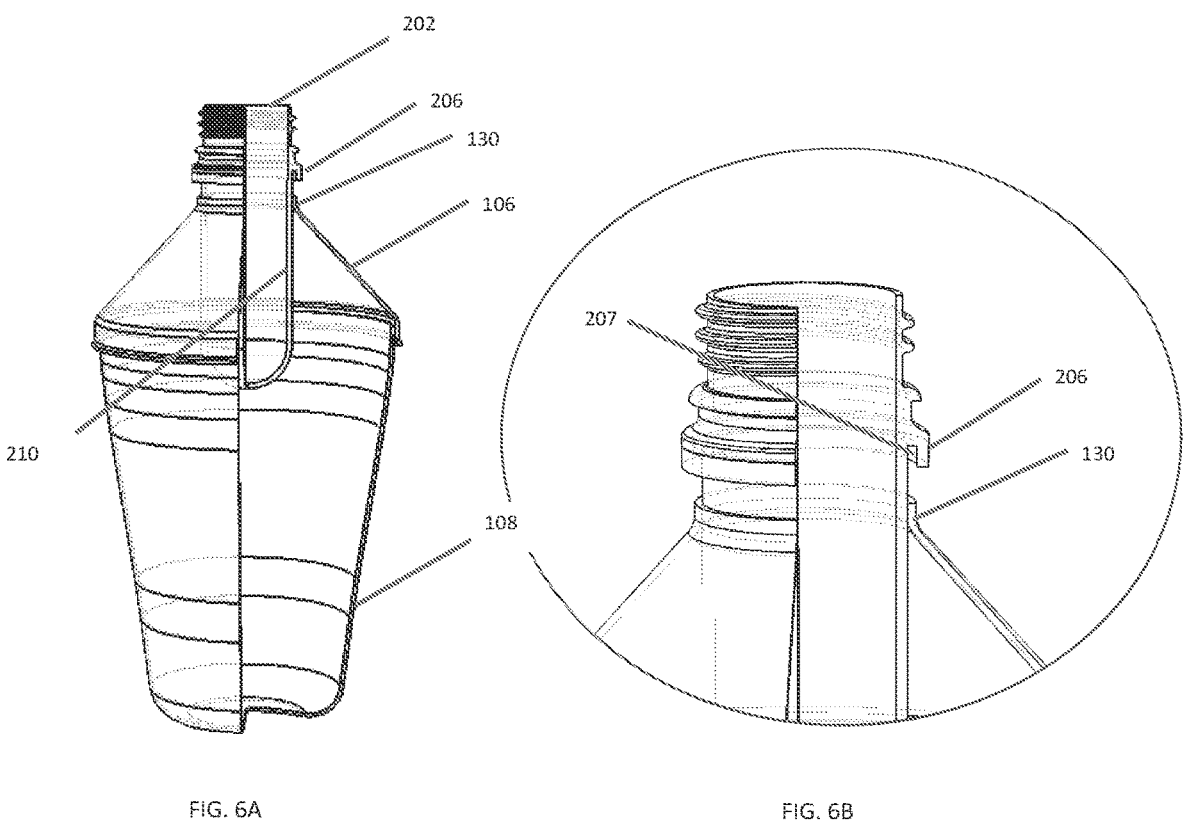
FIG. 6A                    FIG. 6B

PULP BOTTLE WITH MOLDED INTERIOR LINING AND METHODS OF MAKING SAME

CROSS-REFERENCE TO RELATED APPLICATIONS

This application is a U.S. national phase application of International patent application No. PCT/US2021/022094, filed on Mar. 12, 2021; claiming priority to U.S. provisional application No. 62/989,116, filed on Mar. 13, 2020, the disclosure of which is herein incorporated by reference in its entirety.

FIELD OF THE INVENTION

Embodiments disclose molded pulp containers having integral lining within its interior and method of making such container.

BACKGROUND OF THE INVENTION

Plastic drink bottles, such as for bottled water, juice or carbonated beverages, are in wide spread use. Conventional drink bottles are made from thermal plastic polymers, and are typically made through a molding process. The drink bottles need to provide sufficient mechanical strength to support the content and their own weight to be free standing, and also protect the content during packaging and transportation. This sets a minimal amount of plastic that is required for each bottle. The wall of the plastic drink bottles tend to rely on thick component parts, which lead to waste and added cost (e.g., transportation and supply chain management costs). Given the tremendous number of drink bottles made every year, and lack of effective recycling, plastic drink bottles are contributing to worldwide plastic pollution.

Paper and pulp containers are naturally biodegradable, and may be attractive materials as alternatives to plastic drink bottles. However, paper and pulp are naturally porous, and typically not suitable for handling liquid unless some type of lining is incorporated. Beverages can be introduced into the lining portion, where a paper or component may provide structural support for the bottle and the beverage. Conventional methods of fabricating such bottles may require constructing the containers in several structural pieces, each is separately lined with a plastic barrier, and then glued or attached together. Such fabrication methods can be inefficient and ineffective. Such methods also add to the complexity of fabrication and overall weight of the finished container. The finished product also departs from the aesthetic look of traditional drink bottles.

Examples of conventional bottles with linings can be found within the disclosures of U.S. Pat. Nos. 9,126,717, 8,991,635, US 20130140325, US 20130140326, US 20130145730, US 20130146616, US 20130146617, WO 2007066090, CN 103038140, AU 2012211504, WO 2009/133355, and WO 2009/133359.

There exists an unmet need to reduce the amount of plastic used in drink bottles, make it at least partially biodegradable, and still provide the strength suitable for packaging and transportation.

SUMMARY OF THE INVENTION

The present disclosure provides a method of fabricating a lined molded pulp container, the method comprising generating a molded pulp shell, the shell comprising a top opening, a shoulder, a sidewall, and/or a bottom to the shell so as to generate a cavity within the shell, generating a polymer blank, the blank comprising a neck and an expandable portion, at least partially inserting the expandable portion of the blank into the shell via the top opening, placing the polymer blank and the molded pulp shell in a mold, and extending the expandable portion of the blank to make contact of an interior of the cavity of the pulp shell. In some embodiments, the inserting the expandable portion of the blank comprises of securing at least a portion of a rim of the blank to at least a portion of a shoulder of the shell. In some embodiments, the extending the expandable portion of the blank is by blow molding.

In some embodiments, the generating the molded pulp shell comprises forming a container upper, forming a container lower, and joining the container upper and container lower.

In some embodiments, the expandable portion of the blank comprises at least a tube-like piece, which is then expanded. In some embodiments, the polymer blank comprises thermal plastic and/or bioplastic, which for example can be high, medium, and/or low density polyethylene, polyethylene terephthalate, polypropylene, and/or polyvinyl chloride.

In some embodiments, extending the expandable portion of the blank comprises heating at least the expandable portion of the blank. In some embodiments, extending the expandable portion of the blank comprising vacuum drawing at least the expandable portion of the blank. In some embodiments, extending the expandable portion of the blank comprises elongating at least the expandable portion of the blank with a push rod or mandrel. In some embodiments, the extended expandable portion of the blank forms a lining of the interior of the cavity of the pulp shell. In some embodiments, the expanded lining makes contact of substantially the entire interior of the cavity of the pulp shell.

The present disclosure also provides a container, comprises a pulp shell having a top opening and an interior cavity, an interior lining comprising an integral neck, wherein the lining is expanded and makes contact to substantially an entire interior of the cavity of the shell. In some embodiments, the pulp shell comprises a container upper, and a container lower joined together. In some embodiments, the top opening of the shell is located in a shoulder portion of the shell, wherein the shoulder portion increases in dimension from the top opening.

In some embodiments, the lining is at least partially fused to the interior of the pulp shell. In some embodiments, the lining is formed in place within the cavity of the pulp shell by a blow molding process.

In some embodiments, the lining comprises thermal plastic and/or bioplastic, which for example may comprise high, medium, and/or low density polyethylene, polyethylene terephthalate, polypropylene, and/or polyvinyl chloride.

In some embodiments, the integral neck is configured to receive a cap.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIGS. 4A-4D show an embodiment of the lining configured as a parison blank being inserted into an embodiment of the shell (FIGS. 4A-4B) and being transitioned from a contracted state (FIG. 4A-C) to an expanded state (FIG. 4D);

FIGS. 6A-6F shows views of an embodiment of the container wherein the rim of the parison blank is configured to have a recessed grove and the shell having corresponding upper perimeter that is capable of received within the recessed grove prior to the parison blank transition from a contracted state to an expanded state.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
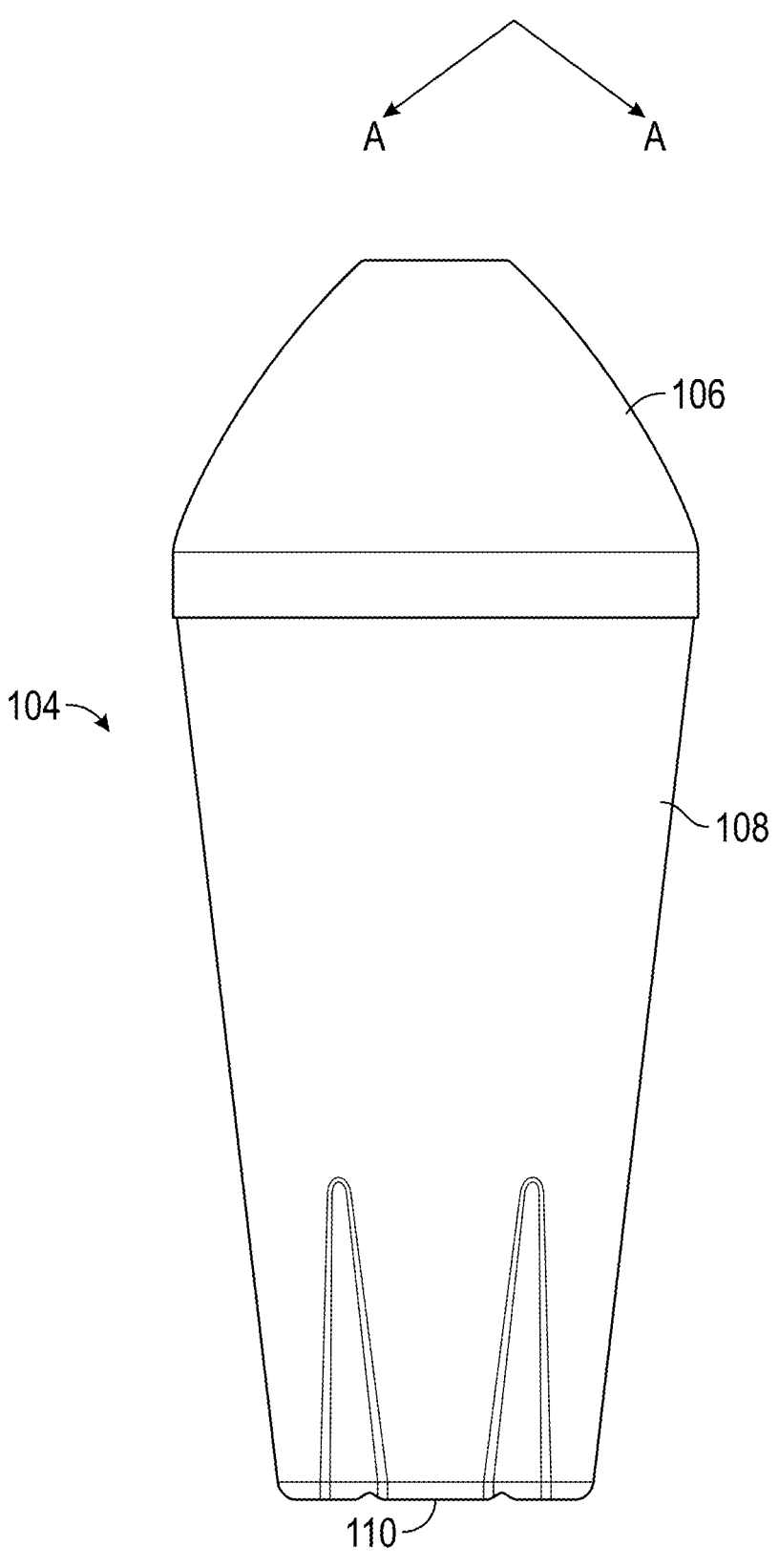
FIG. 1 shows an embodiment of the shell that may be used with the container.
Figure 2:
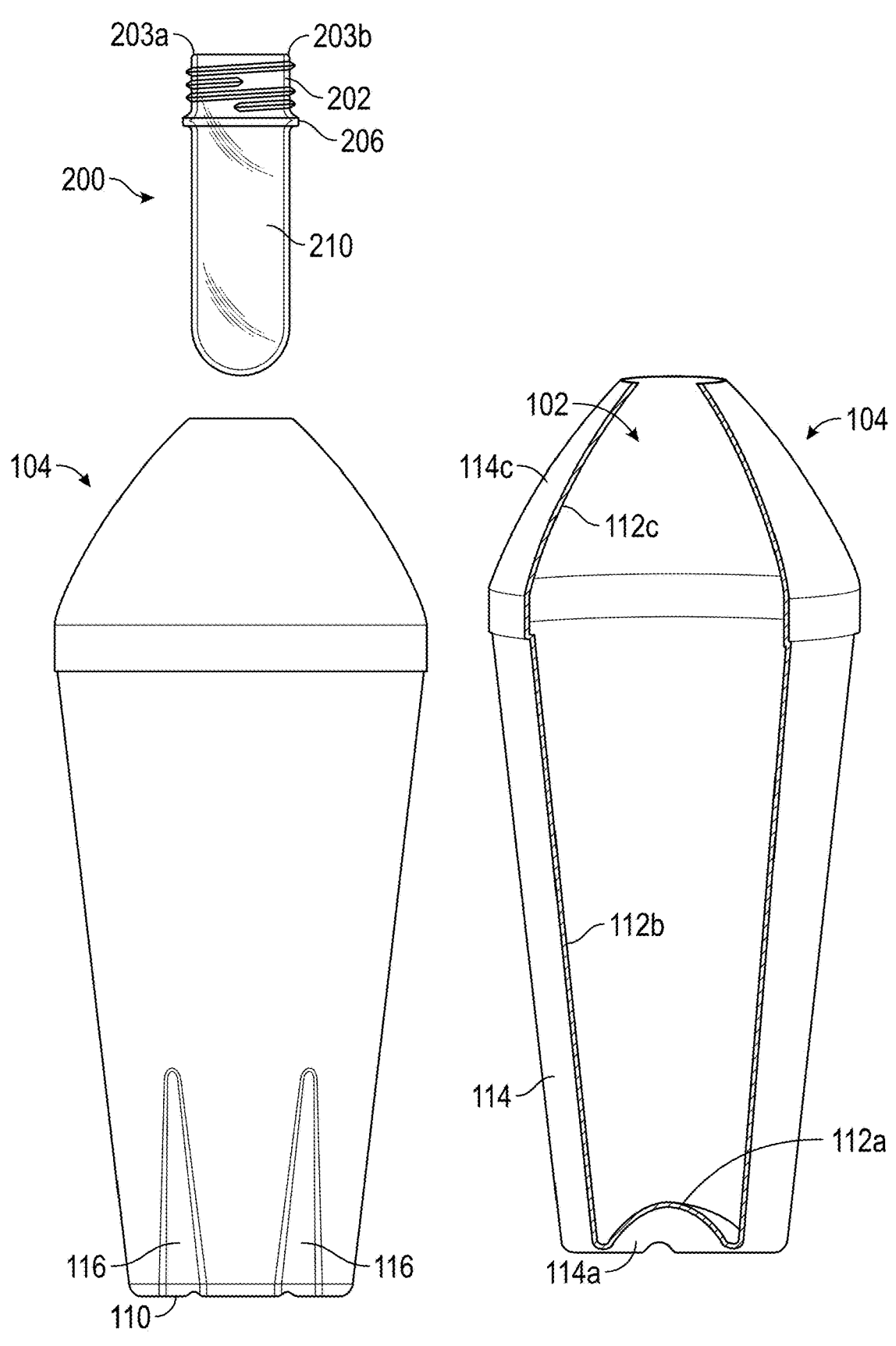
FIG. 2A shows an embodiment of the shell and an embodiment of parison blank that can be expanded to form the lining within the container.
FIG. 2B shows cutout view of an interior of an embodiment of the shell.
Figure 3:
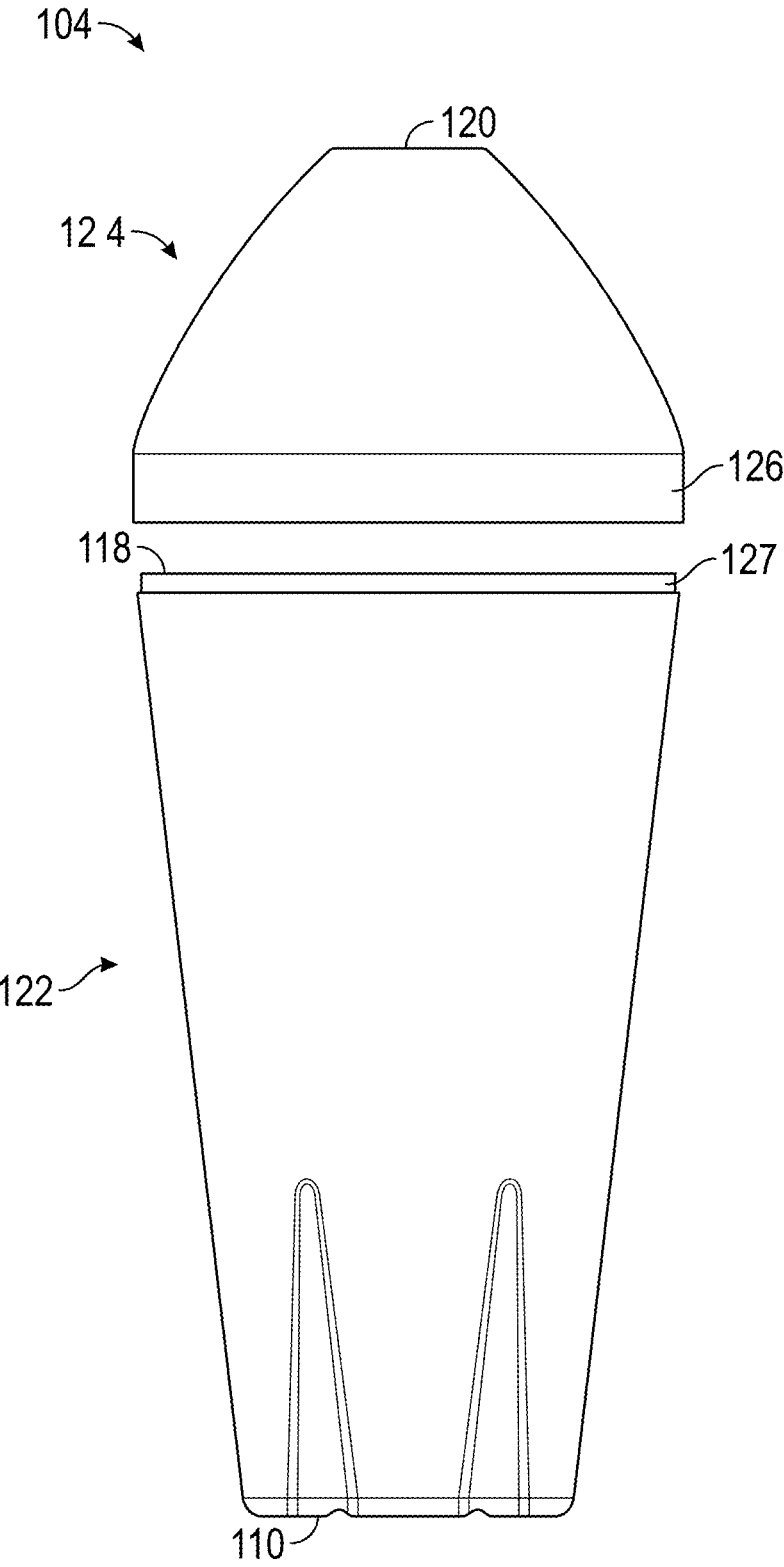
FIG. 3 shows an embodiment of the shell formed with an upper shell and a lower shell.
Figures 5A, 5B, 5C, 5D:
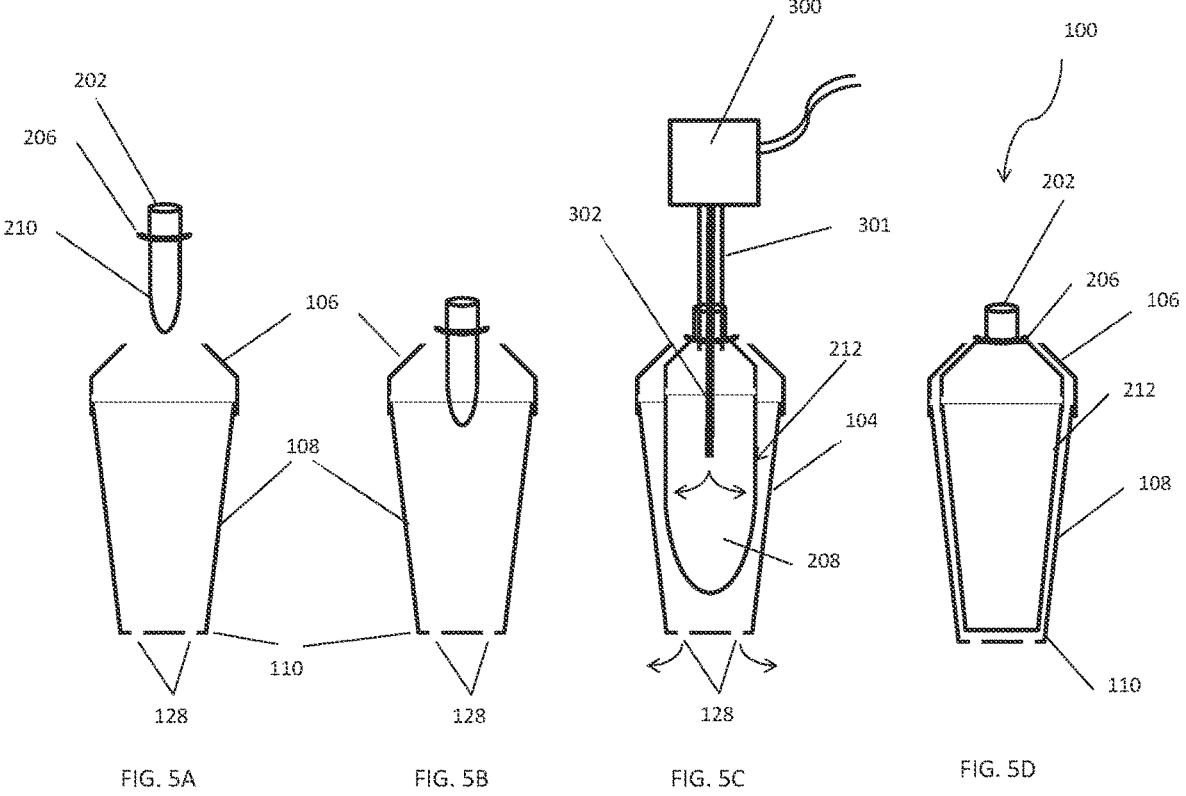
FIGS. 5A-5D show exemplary diagrams of a lining configured as a parison blank being subjected to heat and compressed gas to cause the lining to transition from a contracted state to an expanded state.

Referring to FIGS. 1-3, embodiments disclose a container 100 comprises a shell 104 and a lining 200 with an integral neck 202. The lining 200 can be configured to be placed inside the shell 104. In the finished container 100, the lining 200 is expanded to and makes contact to substantially an entire interior of a cavity 102 of the shell 104. The container 100 can be configured to contain and/or transport fluid. Some examples of fluid that can be contained and/or transported in the container 100 can include water, beverage, juice, oil, condiment, foodstuff, carbonated beverages, etc. While the various embodiments disclosed herein may describe the container being used as a beverage container, the container can be used for other types of containers. The lining 200 can be configured to be expanded into a shell 104. This can include being expanded after the lining 200 has been inserted into a cavity 102 of the shell 104. The lining 200 can be further configured to be expanded by blow molding. Some embodiments can include more than one lining 200.

The shell 104 may include a shoulder 106, sidewall 108, and/or a bottom 110. Any one or combination of the sidewall 108, the bottom 110, and the shoulder 106 can be conjoined. This may be done to form a cavity 102 of the shell 104. The cavity 102 can have a shape that is conducive for holding fluid or beverage, for example. The shell 104 can include inner surfaces 112a, 112b, 112c and outer surfaces 114a, 114b, 114c. The inner surfaces 112a, 112b, 112c can define a shape of the cavity 102. The outer surfaces 114a, 114b, 114c can define a profile shape of the shell 104. The shape of the cavity 102 can be the same as or different from the profile shape of the shell 104.

The bottom 110 can be configured to rest the shell 104 upon a generally flat surface. This can include resting the shell 104 on a flat surface so as to maintain the shell 104 in an upright position. The bottom 110 can be flat, have a concave shape, an undulating shape, i.e., having multiple protrusions, etc. The cross-sectional shape of the bottom 110 along the A-A line (see FIG. 1) can be circular, oblong, polygonal, etc. The bottom 110 can include an inner surface 112a and an outer surface 114a. Any one or combination of the inner surface 112a and outer surface 114a can be smooth, textured, undulating, dimpled, or have some other ornamental feature formed therein or thereon. Ribs or flutes formed in the inner surface 112a and outer surface 114a can also provide additional structural strength. The bottom 110 can have a thickness.

The sidewall 108 can extend from the bottom 110. In some embodiments, the sidewall 108 and bottom 110 can be a single unitary piece. In some embodiments, the bottom 110 can be a separate piece that is attached to the sidewall 108. The sidewall 108 can be rounded, angled, etc. For example, a cross-sectional shape of the sidewall portion of the shell 104 along the A-A line can be circular, oblong, polygonal, etc. For instance, a circular cross-sectional shape can include one continuous sidewall 108 around the perimeter of the shell 104. As another example, a rectangular cross-sectional shape can include four contiguous sidewalls 108, where each sidewall 108 may be substantially planar and joined to each other. The cross-sectional shape of the bottom 110 can be the same as or different from the cross-sectional shape of sidewall 108. Any one or combination of sidewalls 108 extending from the bottom 110 to the shoulder 106 can be straight, exhibit a taper, have an undulating surface, etc. A sidewall 108 can include an inner surface 112b and an outer surface 114b. Any one or combination of the inner surface 112b and outer surface 114b can be smooth, textured, undulating, dimpled, or have some other ornamental feature formed therein or thereon. Ribs or flutes formed in the inner surface 112b and outer surface 114b can also provide additional structural strength. For example, any sidewall 108 can include a ridge 116 formed in a portion of the sidewall 108. The ridge 116 can provide ornamentality, dexterity, rigidity, etc. The inner surface 112b and/or outer surface 114b of one or any combination of sidewalls 108 can be the same as or different from the inner surface 112a and/or outer surface 114a of the bottom 110. The sidewall 108 can have a thickness. Any one or combination of sidewalls 108 can have a same or different thickness as another sidewall 108 or combination of sidewalls 108. The thickness of a sidewall 108 can be the same or different from the thickness of the bottom 110.

The shoulder 106 can extend from a sidewall top 118 (see FIG. 3). In some embodiments, the shoulder 106 and sidewalls can be a single unitary piece. In some embodiments, the shoulder 106 can be a separate piece that is attached to the sidewall 108. The shoulder 106 can be conical, rounded, angled, etc. In some embodiments, the shoulder 106 can gradually extends toward the bottom 110 having the entire shell 104 formed as a unitary piece. For example, a cross-sectional shape of the shoulder 106 line can be circular, oblong, polygonal, etc. For instance, a circular cross-sectional shape can include one continuous shoulder 106 around the perimeter of the shell 104. As another example, a substantially rectangular cross-sectional shape can include four contiguous shoulder portions, wherein each shoulder portion may be substantially planar and joined. The cross-sectional shape of the shoulder 106 can be the same as or different from the cross-sectional shape of the sidewall portion 118 and/or the bottom 110. Any one or combination of shoulder portions extending from the sidewall portion 118 can be straight, exhibit a taper, have an undulating surface, etc. A shoulder portion can include an inner surface 112c and an outer surface 114c. Any one or combination of the inner surface 112c and outer surface 114c can be smooth, textured, undulating, dimpled, or have some other ornamental feature formed therein or thereon. Ribs or flutes formed in the inner surface 112c and outer surface 114c can also provide additional structural strength. Such ribs or flutes can extend the entire or part of the length of the shell 104. The inner surface 112c and/or outer surface 114c of the shoulder 106 can be the same as or different from the inner surface 112c and/or outer surface 112c of the sidewall 108 and/or bottom 110. A shoulder 106 can have a thickness. Any one or combination of shoulder portions can have a same or different thickness as another shoulder portion or combination of shoulder portions. The thickness of a shoulder portion can be the same or different from the thickness of the sidewall 108 and/or bottom 110. The shoulder 106 can include a shoulder opening 120. The shoulder opening 120 can be positioned at a top of the shoulder 106. The shoulder opening 120 can provide ingress and egress to the cavity 102.

The lining 200 can include an integral neck 202. The neck 202 is an integral part of the lining 200, and is typically formed as a single piece in a contracted state 210. The neck 202 may sit atop the shoulder 106, and may be configured to extend through the shoulder opening 120. The neck 202 may be configured to extend upward from the shoulder opening 120. The neck 202 may be attached to the shoulder 106 at or near the shoulder opening 120. The neck 202 can include an inner surface 203a and an outer surface 203b. Any one or combination of the inner surface 203a and the outer surface 203b of the neck 202 may be threaded. This may be done to facilitate a threading engagement with a cap (not shown). Other structural features of the neck 202 that facilitate engagement with a cap with alternative closure mechanisms are also contemplated. This may include an interference fit, snap cap, pop up spout, a swivel cap, etc. The neck 202 is also contemplated to incorporate anti-tempering features that may be desirable for particular applications of the container 100.

Any portion or combination of portions of the shell 104 (e.g., the bottom 110, the sidewall 108, the shoulder 106, etc.) can be fabricated from pulp, wood product, paper, or any combination thereof. This can include recycled or recyclable wood product, paper, and/or pulp. This can include wood product, paper, and/or pulp that is biodegradable or compostable. Additionally, some portion or combination of portions can be made of the same or different material as another portion or combination of portions. For example, plastic portions may be made in combination with pulp portions. Examples of plastic can be a thermoplastic polymer, such as polyethylene (PE), polyethylene terephthalate (PET or PETE), amorphous PET (APET or PETG), crystallized PET (CPET), recycled PET (RPET), ethylene vynel alcohol (EVOH) etc. Bioplastic or biodegradable plastic are also contemplated. For example, the bottom 110 and sidewall 108 may be made from pulp, whereas the shoulder 106 can be made from plastic. Any one or combination of portions can be transparent, translucent, or opaque. Any one or combination of portions of the shell 104 can include a combination of plastic and pulp. This can include ratios of: 100% plastic to 0% pulp; 90% plastic to 10% pulp; 80% plastic to 20% pulp; 70% plastic to 30% pulp; 60% plastic to 40% pulp; 50% plastic to 50% pulp; 40% plastic to 60% pulp; 30% plastic to 70% pulp; 20% plastic to 80% pulp; 10% plastic to 90% pulp; 0% plastic to 100% pulp, or any range to ratios within the ratios identified above. It is preferable to minimize use of overall plastic in the container 100 and the shell 104.

The shell 104 may be made from paper or pulp via conventional methods. Typically, components of the shell 104 can created with typical vacuum molded process. For example, a mesh mold is submerged in a suspended pulp, and vacuum is applied. A layer of pulp is deposited on the exterior of the mesh mold. The mesh mold is then withdrawn from the suspended pulp. Excess water is removed by continue applying vacuum. The pulp layer while still adhere to the mesh mold is then placed into a complementary mold. The pulp layer is removed from the mesh mold and transferred between a set of male/female heated drying tools, which close to generate pressure. The drying tools are then separated, and the formed pulp shell ejected from drying tools.

Alternatively, the shell 104 may be formed as a unitary piece. Particularly, a mold with an interior cavity having the shape of the shell 104 is submerged in a suspended pulp. Vacuum is applied, which draws the pulp to the interior surface of the mold cavity. After a layer of pulp is deposited on the interior of the mold cavity, the mold is withdrawn from the suspended pulp. Excess water is removed by continue applying vacuum. The mold is then opened, and the wet shell 104 is removed from the mold cavity, and subsequently dried.

Embodiments of the shell 104 can also be formed via a press. For example, any portion or combination of portions of the shell 104 can be fabricated by being pressed into a rough shape and then pressed again into a more refined shape. The first press into a rough shape can involve a single press step or a multiple of press steps. The second press into a more refined shape can involve a single press step or a multiple of press steps.

Embodiments of the shell 104 can also be formed via a dry forming process. Dry fiber, e.g., cellulose, can be deposited in a mold, then be molded into its final shape by applying pressure and elevated temperature. Dry fiber can also be formed into a sheet or other initial shape and then pressed in a mold with elevated temperature to form the final shape. Additives, such as binders, can be incorporated with the dry fiber to aid with the dry forming process.

As noted above, any one or combination of the sidewall 108 can be straight, exhibit a taper, etc. In some embodiments, the shell 104 can have a perimeter at or near the bottom 110 that is the same as a perimeter at or near the shoulder 106. In some embodiments, the perimeter at or near the bottom 110 can be greater than the perimeter at or near the shoulder 106. In some embodiments, the perimeter at or near the bottom 110 can be less than the perimeter at or near the shoulder 106. In some embodiments, the bottom 110, sidewall 108, and/or shoulder 106 can be shaped to be supported by a carrier. The carrier can be a pouch, a cup holder, a bicycle bottle bracket, etc.

The shell 104 may be fabricated as a single unitary piece or as a plurality of pieces. For example, FIG. 3 shows the shell 104 as two pieces. It should be noted that any number of pieces can used. For example, the shell 104 can also include three, or four, or five, etc. pieces. The pieces can correspond to a container portion (e.g., bottom 110, sidewall 108, shoulder 106, neck 202, etc.). The pieces can correspond to a section of a container portion. For example, the shoulder 106 may include two pieces. Any one or combination of pieces can be fabricated from plastic, wood product, paper, pulp, bioplastic, etc., preferably with less plastic content. Any one or combination of pieces can be transparent, translucent, or opaque. Any one or combination or pieces can be fabricated from the same or different material as any other piece or combination of pieces.

Any one or combination of container portions and/or pieces can be fabricated from more than one layer. For example, a sidewall 108 can include a layer of plastic and a layer of pulp. Other materials can be used for a layer. For example, a container portion and/or piece can include a metal layer, a silicon layer, etc.

In the exemplary two-piece embodiment of FIG. 3, the shell 104 may include a container lower 122. The shell 104 may include a container upper 124. The container lower 122 can include a bottom 110 conjoined with the sidewall 108 as a single piece. The container upper 124 can include a shoulder 106 as a single piece. The shoulder 106 can include a shoulder lip 126. The sidewall 108 can include a sidewall lip 127. Any of the shoulder lip 126 and/or the sidewall lip 127 can be configured as an overlip. Any of the shoulder lip 126 and/or the sidewall lip 127 can be configured as an underlip. An overlip can be a construction or formation that allows the lip to slide over an underlip lip. An underlip can be a construction or formation that allows the lip to slide under an overlip lip. For example, the shoulder lip 126 can be an overlip that is configured to slide over the sidewall lip 127. In such a case, the shoulder lip 126 can have an inner diameter that is slightly larger than the outer diameter of the sidewall lip 127. As another example, the shoulder lip 126 can be an underlip that is configured to allow the sidewall lip 127 to be slid over it. In such a case, the shoulder lip 126 can have an outer diameter that is slightly less than the inner diameter of the sidewall lip 127. It should be noted that other pieces and/or portions of the shell 104 can include an overlip/underlip construction to facilitate a mating engagement. For example, the bottom 110 and sidewall 108 can have a similar overlip/underlip construction if a shell 104 with separate bottom 110 and sidewall 108 are used (as opposed to a single unitary bottom 110 and sidewall 108 construction).

The mating engagement between the overlip and underlip can include allowing a predetermined amount of surface area contact to occur between two pieces and/or portions. This may be done to facilitate a bond between the two pieces and/or portions. A bond can be achieved via an application of adhesive between the two surfaces that are in contact, an application of heat to cause a bond between at least a portion of the contacting surface areas, an application of ultrasound energy to cause a bond between at least a portion of the contacting surface areas, an application of ultraviolet radiation energy to cause a bond between at least a portion of the contacting surface areas with UV-hardening adhesives, etc. In addition or in the alternative, the mating engagement can include an interference fit, a snap fit, a threaded engagement, etc. In some embodiments, any one of the overlip and underlip can include a groove and the other can include a tongue. The tongue of one lip can be configured to engage with the groove of another lip.

In other embodiments, the container upper and container lower portions can each have corresponding rim. The rims can then be compressed together form a junction between the container upper and container lower portions. This process can be facilitated with the addition of adhesives between the rims of the container upper and container lower portions. The compression of the rims can be achieved by rolling or crimping. The rolled or crimped rims can further be folder to be flush with the outer surface of the shell.

Some further embodiments of the shell can include a gasket positioned at an interface of the container lower 122 and the container upper 124 before the two portions are mated together. At least a portion of the container upper 124 and/or container lower 122 can be transparent, translucent, and/or opaque. Any method of joining different pieces of the shell components are within the scope of this disclosure.

Thus, any one or combination of alternative embodiments of the fabrication of shell 104 may be combined. For example, when shell 104 is formed as a plurality of pieces or when shell 104 is formed as a unitary pieces, shell 104 may be made via conventional methods or via a press, from one or more layers, with the perimeter at or near the bottom 110 greater than or less than or equal to the perimeter at or near the shoulder 106, with the shoulder lip 126 having an outer diameter that is slightly less than or slightly greater than the inner diameter of the sidewall lip 127. These exemplary combinations are not to be take in a limiting sense, but are made purely for the purpose of illustrating the general principles and features of combinations of alternative embodiments of the fabrication of shell 104 as described herein.

Referring to FIGS. 4A-D, in some embodiments, the container 100 can include a lining 200. The lining 200 can be formed in a contracted state 210 as a blank (or parison). The blank may have a neck portion 202 and an expandable portion 204. The expandable portion 204 may be configured to be positioned into the cavity 102. In some embodiments, the expandable portion 204 is configured to expand upon experiencing a differential pressure and heat. The differential pressure can include an increase in pressure within an interior 208 of the lining 200 and/or a decrease in pressure at an exterior of the lining 200. The expandable portion 204 can be inserted through the shoulder opening 120. Upon experiencing a differential pressure, the expandable portion 204 can expand to fill from at least a partial volume of space within the cavity 102, or substantially entire interior of the cavity 102. The expandable portion 204 can expand to take a shape that is the same as, substantially similar to, or different from the shape of the cavity 102. The expanded lining 200 can be used to contain the fluid that may be inserted into the shell 104. In some embodiments, the lining 200 can support the fluid. In some embodiments, the shell 104 supports the weight of the content, whereas the lining 200 can act as a barrier. This can include ensuring that the fluid does not come into contact with at least a portion of the inner surfaces 112a, 112b, 112c of the shell 104. Acting as a barrier can further include not supporting the fluid but merely preventing the fluid from making contact with at least a portion of the inner surfaces 112a, 112b, 112c of the shell 104.

The lining 200 can be fabricated from plastic and/or bioplastic, or compostable material. In some embodiments, the lining 200 can include more than one layer. For example, the lining 200 can include a plastic layer, a metallic layer, etc.

The lining 200 can include a rim 206. For example, the lining 200 can have a rim 206 disposed between the neck 202 and the expandable portion 204. The rim 206 may be configured to mate with the shoulder opening 120. This may be achieved ultraviolet bonding techniques. However, other bonding methods can be used such as an application of adhesive, an application of heat to cause a bond, an application of ultrasound energy to cause a bond, an application of infrared radiation energy to cause a bond, etc., or simply be fiction once the expandable portion 204 is expanded into the cavity 102. This can allow the lining 200 to be attached to the shell 104 at the shoulder opening 120.

The lining 200 can be in a contracted state 210. The lining 200 can be in an expanded state 212. The contracted state 210 can be defined by the expandable portion 204 portion occupying a volume of space $V_1$. The expanded state 212 can be defined by the expandable portion 204 portion occupying a volume of space $V_2$, where $V_2$ is greater than $V_1$. The contracted state 210 can be caused by fabricating a blank, a parison, a preform, and/or other mass that is capable of being expanded. The expanded state 212 can be achieved by blow molding techniques performed on the expandable portion 204. For example, during the manufacturing process of the shell 104, the lining 200 can be inserted into the shell 104. This can include inserting the lining 200 into the shell 104 through the shoulder opening 120 while the expandable portion 204 is in the contracted state 210. The expandable portion 204 can then be transitioned to the expanded state 212. The rim 206 can be attached to the shoulder opening 120 before, during, or after the expandable portion 204 is being transitioned from the contracted state 210 to the expanded state 212.

Referring to FIGS. 4A-D and 5A-D, in at least one embodiment, the lining 200 can be transitioned from the contracted state 210 to the expanded state 212 via blow molding techniques performed on the expandable portion 204. The expandable portion 204 can be configured as a blank, a parison, or preform, for example. This can resemble a tube-like piece. The expandable portion 204 can be plastic and/or bioplastic, or compostable materials. For example, the expandable portion 204 can be a parison fabricated from high, medium, and/or low density polyethylene, polyethylene terephthalate, polypropylene, polyvinyl chloride, etc. The blow molding process can include extrusion blow molding, injection blow molding, biaxial stretch blow molding, co-extrusion blow molding, etc. The blow molding can be intermittent or continuous. The lining 200 blank or parison can be inserted into the shell 104 such that the expandable portion 204 extends into the cavity 102 through the shoulder opening 120. This can include inserting the lining 200 blank or parison into the shell 104 while the expandable portion 204 is in a contracted state 210 (see FIG. 5A-B). The lining 200 can then be caused to transition from the contracted state 210. This can include transitioning from the contracted state 210 to the expanded state 212.

In a non-limiting, exemplary blow mold process, the expandable portion 204 can be formed into a parison. The expandable portion is placed within the shell 104. The parison can be secured to a blow pin 301. Gas (e.g., air) from a compressed gas source 300 can be in injected into the expandable portion 204 via the neck 202. The expandable portion can also be simultaneously heated and/or softened. Before, during, and/or after gas is injected into the expandable portion 204, a push rod 302 may also be inserted through the blow pin 301. The push rod 302 may be used to initiate and/or facilitate expansion of the lining 200 portion of the expandable portion 204. For example, the push rod 302 can be advanced in a direction towards the lining 200 portion of the expandable portion 204. In some embodiments, the push rod 302 can make contact with a surface of the interior 208 of the lining 200. The push rod 302 can be advanced further to initiate and/or facilitate expanding the lining 200.

The compressed gas source 300 can include an air compressor in mechanical connection with the blow pin 301, for example. Some embodiments can include a valve and nozzle assembly to direct and/or control gas flow from the compressed gas source 300 to the lining 200. This can include directing and/or controlling gas flow from the gas source 300 into the interior 208 of the lining 200. In some embodiments, some gas may be permitted to exit the interior 208 through the top portion of the expandable portion 204. The rate as which gas is introduced into the lining 200 may be greater than the rate at which gas is allowed to exit the lining 200. In some embodiments, little to no gas may be permitted to exit the interior 208. This can be achieved by forming a temporary seal between the blow pin 301 and the top portion of the expandable portion 204. The air or other gas that may exist between the expandable portion 204 and the inner surfaces 112a, 112b, 112c of the shell 104 can be allowed to and/or caused to exit the cavity 102 as the lining 200 transitions from the contracted state 210 to the expanded state 212. This can be achieved by forming an aperture 128 in a portion of the shell 104. As the lining 200 transitions from the contracted state 210 to the expanded state 212, the air or other gas in the cavity 102 can be forced out of the aperture 128 or allowed to exit through the aperture 128.

The aperture 128 can be used to allow the gas to exit and/or to cause the gas to exit (e.g., via suction or a vacuum operation). After the lining 200 transitions to the expanded state 212, the aperture 128 can be sealed.

In some embodiments, the shell 104 may be composed of porous material such as molded pulp. Vacuum can be applied around the shell 104, which can be simultaneous as pressure is applied to the interior of the expandable portion 204. The aperture 128 may or may not be needed in these embodiments.

The introduction of heat and gas from the compressed gas source 300 and/or the removal of gas from the space between the lining 200 and the inner surfaces 112a, 112b, 112c of the shell 104 can generate a differential pressure in the interior 208 of the lining 200. This pressure differential can cause the lining 200 to transition from the contracted state 210 to the expanded state 212 (see FIG. 5B-C). The expanded state 212 can be allowing the expandable portion 204 to achieve $V_2$. The expanded state 212 can also be allowing the expandable portion 204 to occupy a substantial portion of or the entire volume of space defined by the cavity 102. After reaching the desired expanded state 212, the process of introducing gas from the compressed gas source 300, the process of allowing gas to exit from the aperture 128, and/or the process of drawing gas from the aperture 128 can be stopped.

In some embodiments, at least a portion of the inner surfaces 112a, 112b, 112c of the shell 104 can be used to define the expanded state 212 of the lining 200. For example, the expandable portion 204 can be caused to expand until at least a portion of it makes contact with at least a portion of the inner surfaces 112a, 112b, 112c of the shell 104. In some embodiments, the inner surfaces 112a, 112b, 112c of the shell 104 can define the shape of the expanded state 212 of the lining 200. For example, the expandable portion 204 can be caused to expand until it occupies at least a substantial portion of the cavity 102. This may cause the expanded expandable portion 204 to take on a shape of the cavity 102. In some embodiments, the expanded state 212 can include at least a portion of the expandable portion 204 making contact with an inner surfaces 112a, 112b, 112c of the cavity 102. This can include an entire outer surface of the expandable portion 204, or a substantial portion of the outer surface of the expandable portion 204, making contact with the inner surfaces 112a, 112b, 112c of the shell 104.

The rim 206 can be attached to the shoulder opening 120 before, during, or after the expandable portion 204 is being transitioned from the contracted state 210 to the expanded state 212. Fluid (e.g., beverage) can be introduced into the container. For example, fluid can be introduced into the container via the top portion of the expandable portion 204 and/or the neck 202. Fluid can be inserted until a predetermined amount of fluid occupies at least a partial volume of space within the interior 208 of the lining 200. This can include all, or substantially all, of the interior 208. After a predetermine amount of fluid has been introduced into the shell 104, the cap 400 may be secured to the neck 202. In some embodiments, the cap 400 may be secured to the neck without introducing any fluid into the shell 104.

In some embodiments, the expanded state 212 can include substantially the entire outer surface of the expandable portion 204 being in contact with the inner surfaces 112a, 112b, 112c of the shell 104. (See FIGS. 4D, 6F). Blow molding the lining 200 can form a semi-rigid to rigid structure of the expanded state 212 of the expandable portion 204. Thus, methods described herein can facilitate the outer surface (or at least a substantial portion of it) of the expandable portion 204 maintaining contact with the inner surfaces 112a, 112b, 112c of the shell 104 while the expandable portion 204 is in the expanded state 212. Heat and pressure differential during the blowing molding process can also soften the expandable portion 204, and cause the exterior of the expandable portion 204 to at least partially fuse with the interior of the shell 104. This can allow the lining 200 to act as a barrier as opposed to supporting the fluid within the shell 104. By acting as a barrier, the weight of the fluid and/or any forces generated by jostling of the fluid can be efficiently and effectively transferred to the shell 104. For example, when all, or substantially all, of the outer surface of the expandable portion 204 is in contact with the inner surfaces 112a, 112b, 112c of the shell 104, vector forces generated by the fluid can be efficiently transferred through the lining 200 and into the shell 104. Similarly, vector forces generated by the shell 104 (e.g., the shell 104 is dropped on the floor) can be efficiently transferred through the lining 200 and into the fluid and/or another portion of the shell 104. In this regard, vector modeling and vector analyses can be used to design shell 104 shapes to more effectively transfer vector forces from one portion of the shell 104, through the lining 200, and into the fluid and/or into another portion of the shell 104. For example, vector modeling and vector analysis can be used to generate a shell 104 shape that effectively disburses the vector forces throughout the shell 104, which may include directing them through at least a portion of the lining 200. Because the outer surface of the expandable portion 204 of the lining 200 maintains contact with the inner surfaces 112a, 112b, 112c of the shell 104, forces can be transferred through the lining 200 without causing a rupture in the lining 200. In other words, because the outer surface of the expandable portion 204 of the lining 200 can maintain contact with the inner surfaces 112a, 112b, 112c of the shell 104, adequate shock absorption can be provided.

It should be noted that the lining 200, after being transitioned to its expanded state 212, can have a tendency to remain in its expanded state 212. Thus, even when some or all beverage or other contents of the shell 104 is dispenses from the shell 104, the outer surface of the expandable portion 204 of the lining 200 can still maintain contact with the inner surfaces 112a, 112b, 112c of the shell 104.

Although it can be done, there typically would not be a need to have any further attachment means or attachment points between the lining 200 and the shell 104, as would otherwise be the case with conventional methods. For example, conventional methods may include a lining within a shell but to maintain contact between the lining and the shell, there is a requirement to attach portions of the lining sidewalls and/or bottom to the shell. This can increase processing steps, add complexity to the fabrication process, and/or add additional costs. With the inventive method, however, the lining 200 can be attached to the shell 104 via the rim 206 and shoulder opening 120 engagement only. This engagement, along with the expanded state 212 of the lining 200, can be used as the only features that facilitate a securement between the lining 200 and shell 104, while further facilitating the outer surface of the expandable portion 204 maintaining sufficient contact with the inner surfaces 112a, 112b, 112c of the shell 104 so as to provide adequate shock absorption.

The sidewalls of the lining 200, whether it is a parison or a preform, can be configured as expand into a thin film. The thin film can be at least one layer. For example, the thin film can include a plastic layer, a metallic layer, etc.

In some embodiments, the construction of the container portions and/or pieces can be such that a portion, a piece, or the entire shell 104 is biodegradable, recyclable, or disposable (meaning non-biodegradable and non-recyclable). In some embodiments, one portion and/or piece can be biodegradable while another can be disposable. Other combinations of biodegradability, recyclability, and/or disposability can be used.

A non-limiting exemplary method of making a bottle with a molded interior lining 200 can include generating a shell 104. The shell 104 can include a shoulder 106, a sidewall 108, and/or a bottom 110. The shell 104 can be configured to include a cavity 102. The shell 104 can be configured to include an opening 120. The opening 120 can be positioned at a top of the shoulder 106. An expandable portion 204 can be formed. The expandable portion 204 includes a parison or a preform. The expandable portion 204 may include a rim 206. The parison or preform can be in a contracted state 210. The expandable portion 204 can be at least partially inserted into the shell 104. This can include at least partially inserting the expandable portion 204 into the opening 120. This can include at least partially inserting the expandable portion 204 within the cavity 102. This can include partially inserting the expandable portion 204 while the expandable portion 204 is in the contracted state 210.

At least a portion of the expandable portion 204 can be secured to at least a portion of the shell 104. This can include securing at least a portion of the expandable portion 204 to at least a portion of the shoulder 106. This can include securing at least a portion of the rim 206 to at least a portion of the shoulder 106. Securing the expandable portion 204 to the shell 104 can be achieved via UV bonding, or simply by friction, for example. Securing the expandable portion 204 to the shell 104 can be performed before, during, and/or after the expandable portion 204 is caused to transition from the contracted state 210 to the expanded state 212.

An inner surface of the expandable portion 204 at or near the top of the expandable portion 204 can be in direct or indirect contact with the blow pin 301. Before, during, and/or after compressed gas is forced through the blow pin 301 and/or a push rod 302. The push rod 302 can be advanced in a direction towards the lining 200 portion of the expandable portion 204. In some embodiments, the push rod 302 can make contact with a surface of the interior 208. The push rod 302 can be advanced further to initiate and/or facilitate expanding the lining 200. Heat and gas from a compressed gas source 300 can be in injected into the expandable portion 204 via the top portion of the expandable portion 204. The heat and pressure differential can cause the lining 200 portion of the expandable portion 204 to transition from the contracted state 210. This can include transitioning from the contracted state 210 to the expanded state 212. The gas that may exist between the expandable portion 204 and the inner surfaces 112*a*, 112*b*, 112*c* of the shell 104 can be allowed to and/or caused to exit the cavity 102 as the lining 200 transitions from the contracted state 210. The blow pin 301 may be removed from the expandable portion 204.

In previously described blow molding process, the shell 104 and the lining 200 is typically held within a mold, which supports the shell 104 during the molding process. When the lining 200 is fully expanded, and can retain its expanded state 212 (e.g., sufficiently cooled), the mold can be opened and the completed the container 100 ejected from the mold. Channels can be cut within the mold to allow air to escape the mold cavity during the expansion of the lining 200.

Figures 6C, 6D:
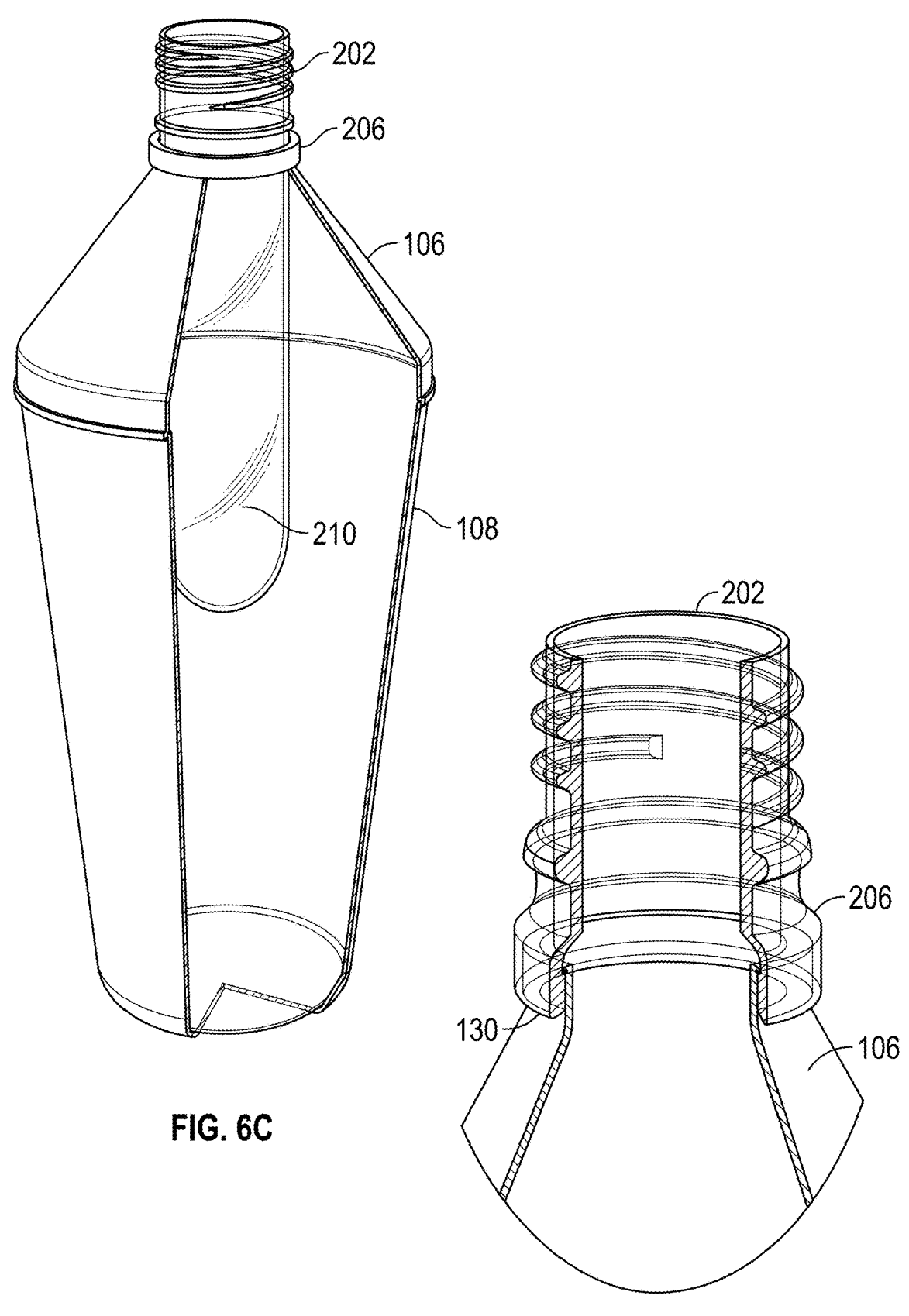
Figure 6E:
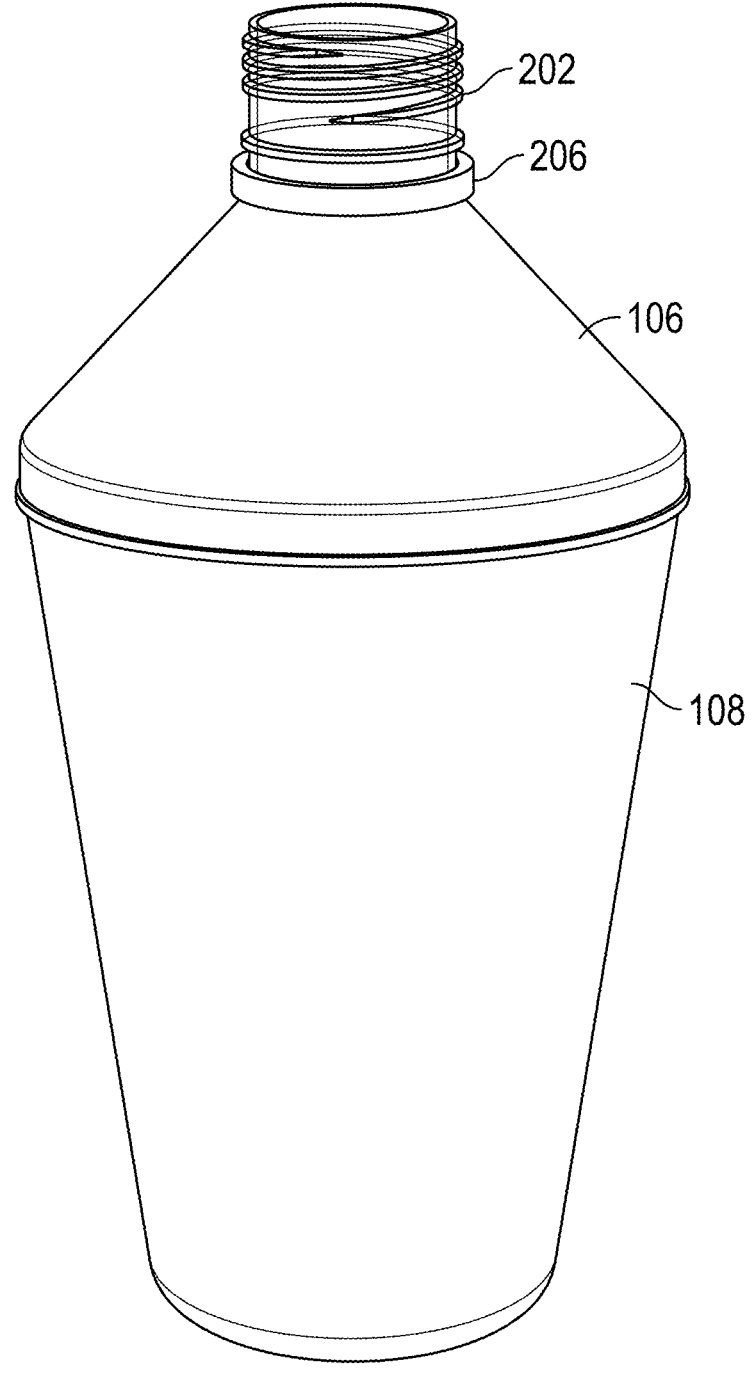
Figure 6F:
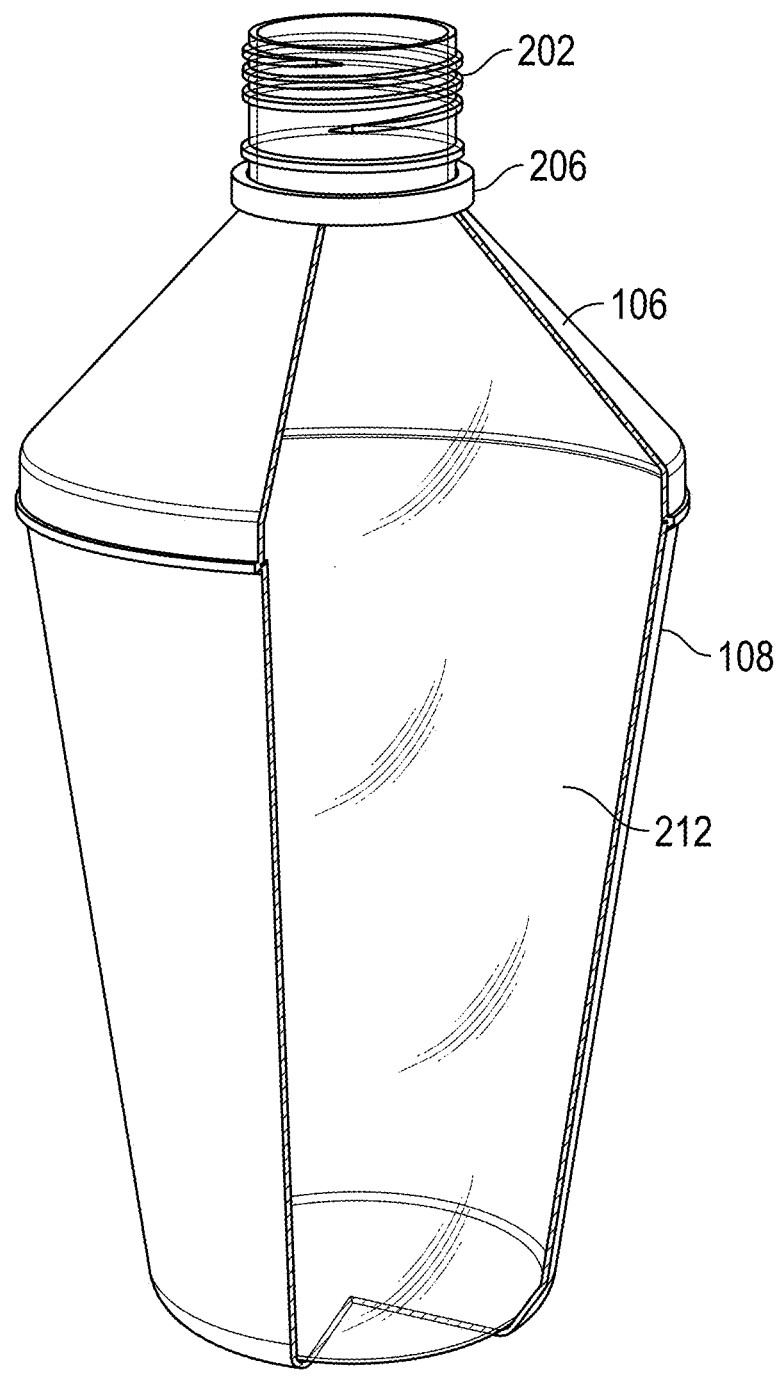

FIGS. 6A-F illustrate an additional embodiment of the container. Particularly, the rim 206 of the embodiment shown comprises a recessed grove. The recessed grove 207 can have a generally L-shaped cross-section. The recessed grove can be configured to receive an upper perimeter 130 of the shell. FIGS. 6A and 6B illustrate the parison or blank having a rim 206 with a recessed grove 207 being inserted into a shell 104. The shell 104 having a upper perimeter 130 configured to fit within the recessed grove 207. In this particular embodiment, the upper perimeter 130 extends from the shoulder 106. The lining 200, when in the contracted state 210, can rest on the upper perimeter 130 of the shell 104. The upper perimeter 130 is shown accommodated in the receded grove of the rim 206 (FIGS. 6C and 6D). The ling 200 can then be expanded to its expanded state 212 according to any process describe above. When fully expanded, the lining 200 can be held in place by friction alone. The expansion of the lining compresses the upper perimeter 130 between the rim 206 and the expanded portion of the lining (FIGS. 6E and 6F).

The present disclosure also contemplates a container comprises a pulp shell having a top opening and an interior cavity. The pulp shell having an interior lining comprises an integral neck. The lining is expanded and makes contact to substantially an entire interior of the cavity of the shell. The pulp shell may be formed using any processes disclosed supra. In some embodiments, the pulp shell comprises a container upper, and a container lower joined together. The container upper and container lower portions can be joined by any means disclosed supra. The top opening of the shell may be located in a shoulder portion of the shell, wherein the shoulder portion increases in dimension from the top opening. The lining comprises thermal plastic and/or bioplastic, which for example may be high, medium, and/or low density polyethylene, polyethylene terephthalate, polypropylene, and/or polyvinyl chloride. The lining may be at least partially fused to the interior of the pulp shell. The lining may be formed in place within the cavity of the pulp shell by a blow molding process. Such that a blank or parison having an integral neck and expandable portion is placed within the top opening. The expandable portion is heated and expanded by a pressure differential and/or mechanical force to contact at least partially the interior of the cavity of pulp shell. The integral neck is configured to receive a cap.

It should be understood that modifications to the embodiments disclosed herein can be made to meet a particular set of design criteria. For instance, the number of containers

100, container bodies 104, container uppers 124, container lowers 122, bottoms 110, sidewall 108, shoulders 106, necks 202, linings 200, blanks 204, apertures 128, container portions, container pieces, and other components can be any suitable number of each to meet a particular objective. The particular configuration of type of such components can also be adjusted to meet a particular set of design criteria. Therefore, while certain exemplary embodiments of devices and methods of making and using the same have been discussed and illustrated herein, it is to be distinctly understood that the invention is not limited thereto but may be otherwise variously embodied and practiced within the scope of the following claims.

What is claimed is:

1. A method of fabricating a lined molded pulp container, the method comprising:
   generating a molded pulp shell, the shell comprising a top opening, a sidewall, and/or a bottom to the shell defining a cavity within the pulp shell;
   providing a polymer blank, the blank comprising a neck and an expandable portion;
   at least partially inserting the expandable portion of the blank into the shell via the top opening; and
   extending the expandable portion of the blank to make contact of an interior of the cavity of the pulp shell by,
   heating and softening at least the expandable portion of the blank,
   applying positive pressure to at least an interior of the expandable portion of the blank,
   concurrently applying vacuum around the pulp shell,
      wherein the extended expandable portion of the blank forms a lining of the interior of the cavity of the pulp shell,
   adhering the lining to the interior of the cavity of the pulp shell.

2. The method recited in claim 1, wherein the molded pulp shell further comprising a shoulder, wherein inserting the expandable portion of the blank comprising of securing at least a portion of a rim of the blank to at least a portion of a shoulder of the shell.

3. The method recited in claim 1, wherein extending the expandable portion of the blank is by blow molding.

4. The method recited in claim 1, wherein generating the molded pulp shell comprises forming an upper shell, forming a lower shell, and joining the upper and lower shells.

5. The method recited in claim 1, wherein generating the molded pulp shell comprises forming the molded pulp shell as a unitary piece.

6. The method recited in claim 1, wherein the expandable portion of the blank comprises at least a tube-like piece, which is then expanded.

7. The method recited in claim 1, wherein the polymer blank comprises thermal plastic and/or bioplastic or compostable material.

8. The method recited in claim 1, wherein the polymer blank comprises high, medium, and/or low density polyethylene, polyethylene terephthalate, polypropylene, and/or polyvinyl chloride.

9. The method recited in claim 1, wherein extending the expandable portion of the blank comprising elongating the at least the expandable portion of the blank with a push rod or mandrel.

10. The method recited in claim 1, wherein the expanded lining makes contact of substantially the entire interior of the cavity of the pulp shell.

11. The method recited in claim 1, further comprising forming at least one aperture in the bottom of the pulp body.

12. The method recited in claim 1, wherein adhering the lining to the interior of the cavity of the pulp shell is by heat bonding.

\* \* \* \* \*